April 1, 1958     A. CALDERON     2,828,874
FURNACE LOADING APPARATUS
Filed April 5, 1954     3 Sheets-Sheet 2
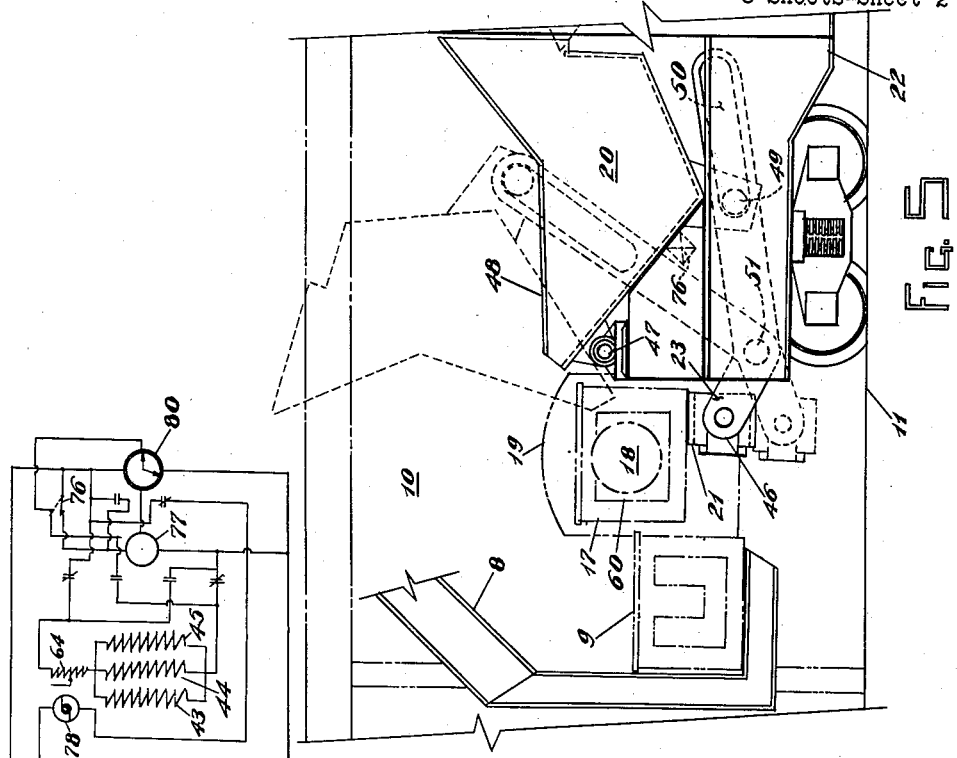
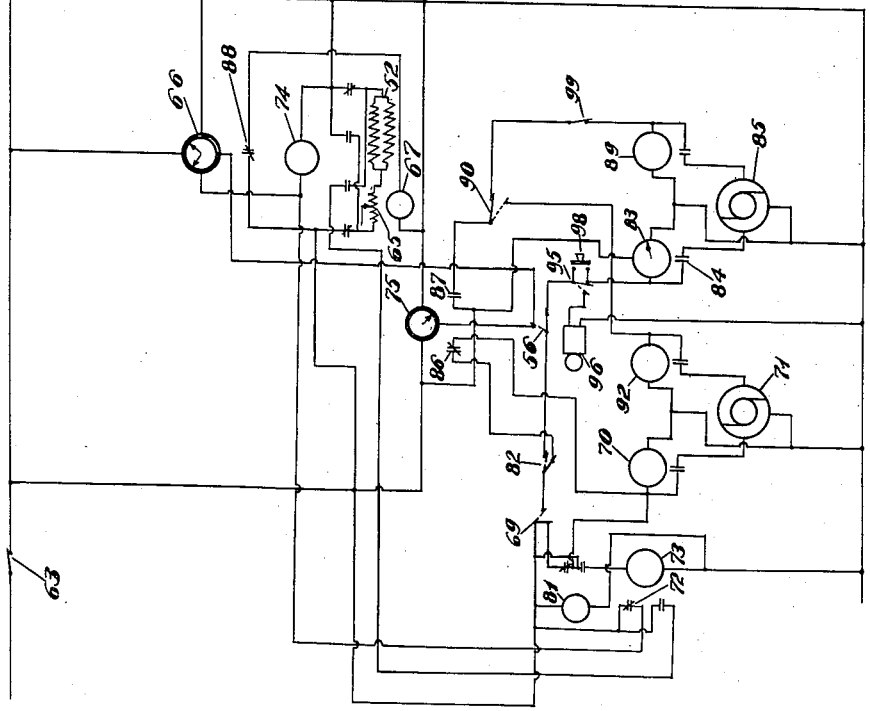

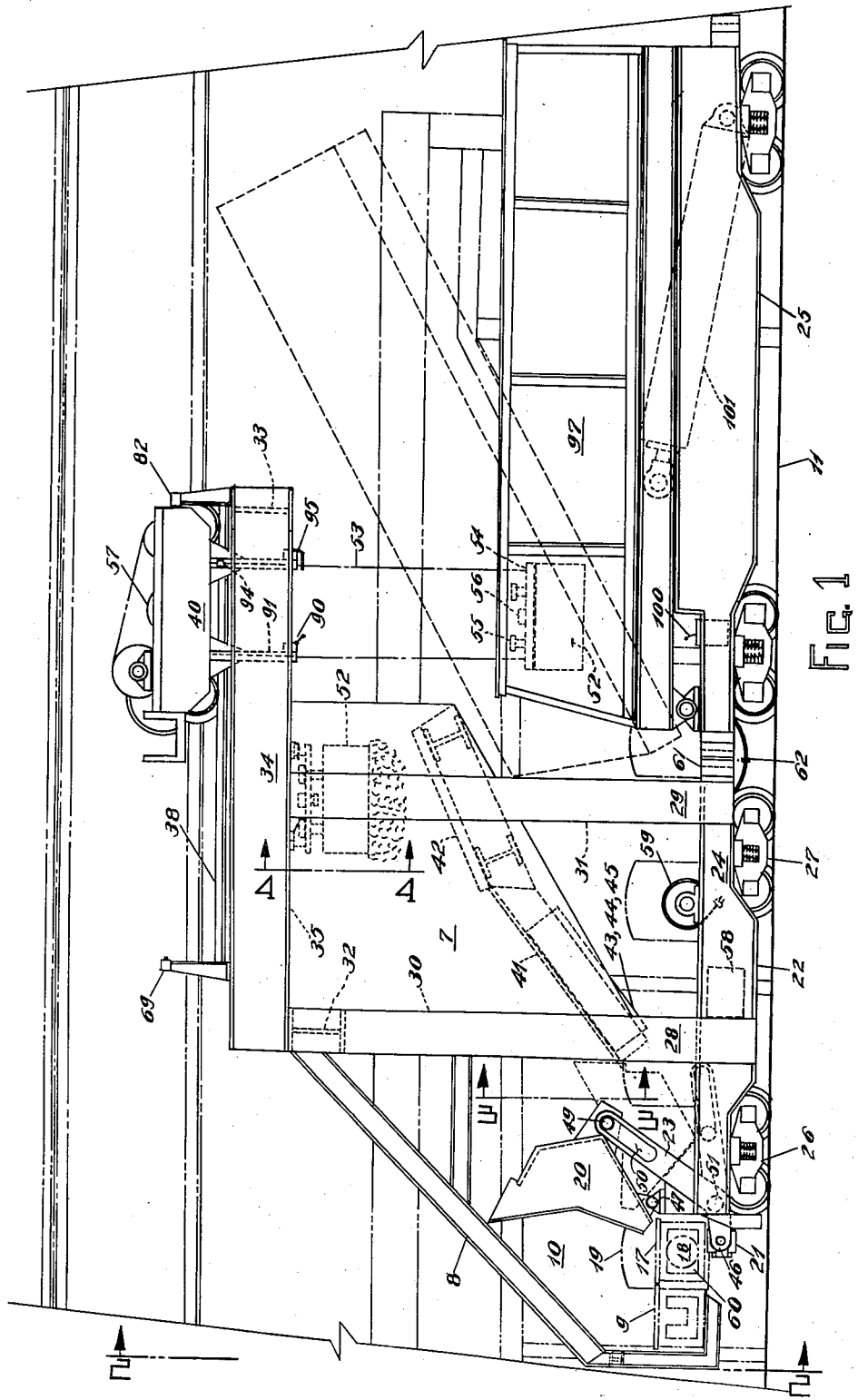

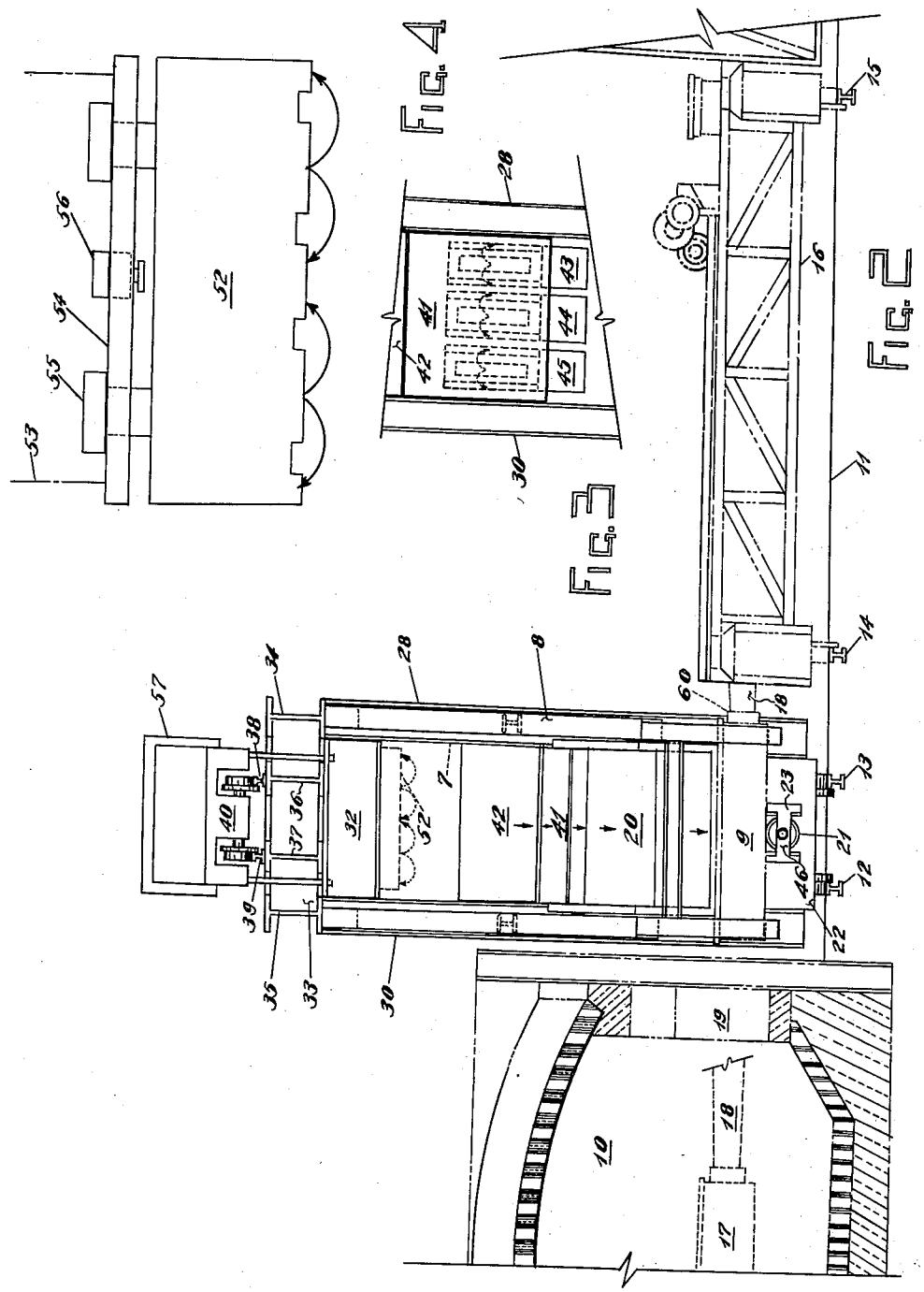

United States Patent Office 2,828,874
Patented Apr. 1, 1958

2,828,874

FURNACE LOADING APPARATUS

Albert Calderon, Ravenna, Ohio, assignor to Industrial Automation, Inc., Detroit, Mich.

Application April 5, 1954, Serial No. 421,144

12 Claims. (Cl. 214—18)

This invention relates to the delivery and loading apparatus for the steel industry as shown and described in my prior applications for patents, having Serial Nos. 336,045 and 344,298, filed on February 10, 1953, and on March 24, 1953, respectively. More particularly, this invention relates to the loading apparatus which receive material from delivery means in front of the furnace charged and which feed from the received material into a charging container which is repeatedly filled with and cooled by said material; said container is repeatedly emptied into said furnace by means of a conventional charging machine.

In the charging of magnetic material into steel melting furnaces, as for example open hearth furnaces, said material comprising scrap, pig iron and scale, containers of roughly the shape and size of open coffins are filled with said magnetic material in the stockyard and are brought to the charging floor on buggies by means of a locomotive; said buggies which run on rails are located along the front of the furnace charged. The charging machine which runs parallel to the furnaces which are situated side by side in battery form, picks up a single container from a buggy, inserts it into the furnace through one of the doors thereof, empties the contents of said container, pulls it out of the furnace, lays it on the buggy, picks up a second container, a third, etc., following the same pattern of charging until the complete charge is thus transferred from the containers into the furnace. Since the charge of magnetic material for an average heat of an open hearth using 50% hot metal is roughly 120 tons, the number of such containers per furnace charge is so great that it is impractical, if not impossible, to bring to the charging floor all the containers simultaneously, and they are therefore brought in sections or "drags" despite which fact a long train of buggies is formed thereby minimizing production by a charging cycle which is too long, causing floor congestion, blocking the doors of the adjacent furnaces, wasting too much heat through the charging doors and using the charging machine for an excessive length of time.

Few schemes have been proposed to solve the aforementioned disadvantages, yet none has been found to do so without major revamping of present facilities and without interrupting production.

With the foregoing considerations in mind, the principal object of my invention is to increase production of steel by providing a very efficient apparatus, operating in conjunction with either of the scrap vehicles described in the applications enumerated hereinbefore, that greatly reduces the length of the present charging cycle; said apparatus is of an improved construction than the apparatus also shown and described in said pending applications, and especially with respect to the manner of transferring material, orientation of said material and elimination of spillage.

Another object of my invention is to leave present facilities unaltered by providing an apparatus that is flexible enough to operate without any change whatsoever.

Still another object of my invention is to keep production running at full capacity by providing an apparatus that is mobile so that it is assembled for installation where there is no production and brought on rails by a locomotive to the charging floor where operation takes place.

A further object of my invention is to eliminate floor congestion by providing an apparatus, operating in conjunction with either of said scrap vehicle, that eliminates all buggies and makes possible the bringing of magnetic material in bulk form to the furnace charged.

A still further object of my invention is to eliminate the blocking of the doors of the adjacent furnaces by providing equipment that occupies little space.

Yet another object of my invention is to drastically reduce the present number of charging containers by providing an apparatus that uses one container repeatedly until it becomes red hot from repetitive insertion into the furnace charged by means of a conventional charging machine.

It is yet another object of my invention to make possible a continuous charging cycle by providing an apparatus that has access to magnetic material to be charged at all times during charging of a furnace.

Therefore an object of my invention is to make possible the use of combustion oxygen renumeratively by providing an apparatus that is very fast in dispensing magnetic material to be inserted into the furnace charged.

Therefore another object of my invention is to reduce maintenance of furnace fronts by providing an apparatus that exceedingly cuts down the necessity of the bridge travel of the conventional charging machine while charging with the same charging container repeatedly.

It is therefore another object of my invention to save fuel by providing an apparatus that charges the furnaces fast enough that the charging doors, through which heat is lost, are kept open for a relatively short period of time.

Further yet, another object of my invention is to make possible the reduction in charging machine facilities by providing an apparatus that decreases charging time and thereby employs a charging machine for a relatively short period of time.

With the above and other objects in view, my invention consists briefly of providing a travelling loading apparatus running on conventional rails laid adjacent to a battery of furnaces, as for example open hearth furnaces, and operating in conjunction with either of said scrap vehicles. Said loading apparatus comprises a carriage with coupling means and wheels, movable along a track in front of said battery by means of the peel of the conventional charging machine; a supporting framework extending vertically from said carriage to form a box-like superstructure crowned with horizontal cantilevered members; a declined orientation chute; a hoisting means equipped with a lifting electromagnet, adapted to travel on said cantilevered members while said electromagnet serving to lift magnet loads of magnetic material from a vehicle coupled to said carriage and to drop said loads on said orientation chute where they are oriented magnetically, and a tiltable bucket to receive the oriented material and to transfer it to a charging container. In operation, said loading apparatus is located by said charging machine in front of the furnace charged and a vehicle, hereinafter termed "scrap vehicle," loaded with magnetic material is brought by a locomotive to said furnace and coupled to said loading apparatus. Part of said scrap vehicle, hereinafter termed "pick-up point," is thus lodged under said cantilevered horizontal members so that said lifting electromagnet has access to the magnetic material contained in said pick-up point. To deliver oriented material into a charging container which is repeatedly filled with and cooled by said material, and which is repeatedly emptied into said furnace, said container by means of the peel of said charging machine is rested on tilting members of said bucket to cause it to tilt and thereby fill said container. As the contents of the pick-up point are depleted, more material is advanced thereto by tilting the body of said scrap vehicle above the angle of repose and then dropping it thereunder.

Other objects, purposes and advantages of the instant invention will more fully appear or will be understood by those skilled in the art to which this invention relates from the following description of certain embodiments thereof. Reference is made to the accompanying drawings forming a part hereof, and in which:

Figure 1 is a partial front elevation of one of several open hearth furnaces which constitute a battery, an end view of a conventional charging container, a side view of the loading apparatus and a side view of the scrap vehicle.

Figure 2 is a sectional view taken at 2—2 of Figure 1. It shows a partial section of the open hearth furnace, a front end view of the loading apparatus and a side view of the conventional charging machine with the conventional charging container at its peel.

Figure 3 is a broken view taken at 3—3 of Figure 1. It shows a partial front end view of the declined orientation chute.

Figure 4 is a broken view taken at 4—4 of Figure 1. It shows the front elevation of the suspended multipolar lifting electromagnet which transfers magnetic material from the scrap vehicle to the orientation chute.

Fig. 5 is an enlarged side view of the bucket and its operating components, used to fill the conventional charging container repeatedly and without spillage.

Figure 6 is a wiring diagram showing one form of wiring arrangement that can be used for operatively connecting to automatically control the working components of the loading apparatus shown in Figures 1 and 2.

Referring to the drawings, 10 is one of several open hearth furnaces which constitute a battery and 11 is the charging floor in which conventional buggy rails 12 and 13 are imbedded adjacent and parallel to the battery of furnaces. Rails 14 and 15 are also imbedded in floor 11 for the use of the conventional charging machine 16 whose primary functions are: (1) To repeatedly insert and empty sideways the contents of charging container 17 into furnace 10 by means of peel 18 through any one of the furnace's doors, such as door 19. (2) To tilt bucket 20 so as to fill charging container 17 by resting said container which is locked to peel 18 on roller 21 of tilting assembly 23. (3) To exchange cold container 9 provided for on lean-to 8 of apparatus 22 for container 17. (4) To move loading apparatus 22 from door to door or from furnace to furnace for charging by pushing to the left or to the right by means of peel 18 locked in socket 60 of container 17.

Loading apparatus 22 and scrap vehicle 25 run on rails 12 and 13 which extend along the whole front of the battery of furnaces and to the stockyard where preparation of scrap and loading of vehicles, similar to scrap vehicle 25, take place.

Loading apparatus 22 which runs on charging floor 11 at all times, comprises a carriage or a base 24 made of horizontal heavy girders mounted with swivelling effect in the form of a bridge tied together underslingingly on two trucks 26 and 27 with each group of wheels connected by means of a bolster. Vertical columns 28, 29, 30 and 31 extend from carriage 24, and horizontal beam 32 ties the top of column 28 to the top of column 30. On top of columns 28, 29 and 30, 31 secondary girders 34 and 35 are respectively spanned horizontally in such a way that they roughly extend one half of their length beyond columns 29 and 31 in a cantilevered fashion, and are tied together at the cantilevered end by means of beam 33. Secondary beams 36 and 37 are laid between secondary girders 34 and 35 to span from beam 32 to beam 33 so that rail 38 lays on beam 36 and rail 39 lays on beam 37. Motorized trolley hoist 40 runs on rails 38 and 39.

Hoist 57 of motorized trolley 40 can be moved back and forth on rails 38 and 39 by means of a cylinder or the like.

Using columns 28, 29, 30 and 31 as supports, a chute having two parts 41 and 42 is rigidly disposed to said columns with part 41 being more declined than part 42 but both parts 41 and 42 being declined to angles greater than the angle of repose of magnetic material. Part 41, hereinafter termed "decline 41," serves to orient magnetic material whereas part 42, hereinafter termed "impact stand 42," serves to receive the impact from the loads dropped on it. Decline 41 and impact stand 42 are either cast or structurally built with sides, such as side 7.

Across the underneath side of decline 41 and towards the discharge end thereof, electromagnetic means such as rectangular electromagnets 43, 44 and 45 are disposed in such a way that their faces come as close as possible to the tough surface of decline 41 so that the maximum effect of the strength of electromagnets 43, 44 and 45 is derived by inducing the maximum amount of flux to said surface which is non-magnetic. Electromagnets 43, 44 and 45 which are of the multipolar type and which are preferably wound for continuous duty, have their magnetic lines of force travelling in the direction of the width of decline 41 so that magnetic material and especially long pieces of scrap orient in that direction.

Bucket 20 which tilts about pivot 47 and which receives the magnetic material after orientation, has the horizontal part of its top 48, when in the receiving position, not higher than the arch of door 19. The reason for this is the necessity for the yoke of peel 18 to clear bucket 20 when charging machine 16 inserts container 17 into the remote part of furnace 10. The bottom of bucket 20, which may be flat or concave, is connected by means of follower 49 travelling in slots, such as slot 50, to tilting members assembly 23 whose ends in turn travel through arcuate paths about pivot 51. At tipping end 46 of tilting members assembly 23, roller 21 is universally disposed thereto so as to keep level the surface pushed down as well as facilitate the riding of container 17 on tipping end 46.

Since container 17 becomes red hot from its repetitive insertion into furnace 10, adequate storage space for container 9, such as lean-to 8 transversally extending from columns 28 and 30, is provided on loading apparatus 22 so that an easy exchange of container 17 for container 9 is made possible. Container 9 when stored, collects any spillage which may occur during the filling of container 17 by means of bucket 20.

A multipole lifting electromagnet 52, preferably of rectangular shape with the magnetic lines of force travelling across the face thereof, is provided for as a loading means to transfer magnetic material from said pick-up point of scrap vehicle 25 to impact stand 42. Electromagnet 52 is designed to fit inside vehicle 25 without hitting the sides thereof and is indirectly suspended from motorized hoist 57 by means of a plurality of cables, like cable 53, fastened to frame 54 which serves as a member to directly suspend therefrom electromagnet 52 by means of heavy pins, like pin 55, guided in frame 54. Said cables are fastened at different points on frame 54 so that no swing or sway occurs. The reason for suspending electromagnet 52 by means of said pins from frame 54, is to obtain a slight vertical play between frame 54 and the back of electromagnet 52 to actuate limit switch 56 mounted on frame 54, when electromagnet 52 rests on magnetic material contained in the pick-up point. The actuation of switch 56 reverses the direction of travel of hoist 57 and renders electromagnet 52 effective.

A control cabinet 58 with all the controls for operation is mounted on carriage 24 and power for operation is brought thereto by means of reel and cord 59 connected to a power source on furnace 10 or the vicinity thereof.

In operation, assuming that it is desired to charge furnace 10 with magnetic material, the operator of charging machine 16 locks peel 18 in socket 60 of container 17, moves loading apparatus 22 to furnace 10 and locates the center of container 17 with the center of charging door 19 through which charging will start. Scrap vehicle 25 which is brought to the floor by means of the conventional locomotive is coupled to loading apparatus 22 by means of coupling 61. The second helper of furnace 10, whose main duty is to open and close the furnace doors during charging, connects extension cord 62 of vehicle 25 to apparatus 22 to acquire power to operate tilting means of vehicle 25, next connects control cabinet 58 of apparatus 22 to power source by means of reel and cord 59 and signals to the operator of charging machine 16 who begins with the operation of tilting bucket 20 to fill container 17 whose contents he empties into furnace 10.

Referring to the wiring diagram for the detailed description of the operation, the position of trolley 40 being over impact stand 42, the second helper closes master switch 63 and the following takes place:

Timer 66 by means of two-pole double-throw relay coil 74 operated through closed contacts 72 of relay coil 73, first momentarily reverses the polarity of lifting electromagnet 52 through which power constantly flows, and next renders electromagnet 52 ineffective by means of resistor 65 placed in series by relay coil 67. Limit switch 69, which is normally open, energizes relay coil 70 to close the contacts thereof and operate motor 71 which starts trolley 40 moving towards the pick-up point of scrap vehicle 25. Timer 80 repeatedly renders orientation electromagnets 43, 44 and 45 ineffective and effective, first by reversing momentarily their polarity by means of two-pole double-throw relay coil 77 to dissipate residual magnetism, second by placing resistor 64 in series by means of reciprocating motor 78 to cut the voltage down and third by removing resistor 64 from the circuit also by means of reciprocating motor 78 to build the voltage up again.

As trolley 40 moves towards the pick-up point, limit switch 69 opens and direct current flows to motor 71 through closed contacts 86 of timer 75 instead of through closed contacts of relay coil 81. When trolley 40 reaches over the pick-up point, it opens limit switch 82 which stops trolley 40 and energizes time-relay coil 83 which in turn closes contacts 84 thus operating motor 85 to lower lifting electromagnet 52 to the pick-up point. When electromagnet 52 rests on magnetic material in scrap vehicle 25, frame 54 rests on the back of electromagnet 52 and limit switch 56 is thus actuated. The actuation of limit switch 56 performs the following: 1. Motor 85 stops lowering electromagnet 52. 2. Timer 75 is started thereby opening contacts 86 and closing contacts 87. 3. Timer 66 is started thereby opening contacts 88 which de-energize relay coil 67 to remove resistor 68 from the circuit and therefore render electromagnet 52 effective. 4. Motor 85 is turned in the opposite direction by energizing coil relay 89 and thus raising electromagnet 52 with a load of magnetic material from the pick-up point. Time-relay coil 83 leaves contacts 84 open for an adequate period of time so that the lifting of electromagnet 52 is not disturbed.

As ascending electromagnet 52 opens limit switch 90 on cable guide 91, motor 85 stops the raising and motor 71 through relay coil 92 moves trolley 40 with a load of magnetic material towards impact stand 42. Trolley 40 closes switch 69 located at the end of the lateral travel and motor 71 reverses its lateral motion to start another cycle. In addition to reversing the motion of motor 71, switch 69 through relay coils 81 and 73, and by means of relay coil 74 the polarity of electromagnet 52 is momentarily reversed; by means of relay coil 67 operated through timer 66, resistor 65 is placed in the circuit to make electromagnet 52 ineffective and thereby let its load of magnetic material drop on impact stand 42. Timer 75 closes contacts 86 while opens contacts 87 after limit switch 90 has been actuated so that the sequence of operation is guaranteed.

The magnetic material dropped on impact stand 42 tends to loosen and spread thereby facilitating its orientation by means of electromagnets 43, 44 and 45. The orientation operation is accomplished as follows: Timer 80 actuates relay coil 77 which reverses momentarily the polarity of electromagnets 43, 44 and 45 and next actuates motor 78 which places resistor 64 in series with electromagnets 43, 44 and 45 to thereby render them magnetically ineffective. When timer 80 times out, motor 78 removes resistor 64 from the circuit thereby rendering electromagnets 43, 44 and 45 magnetically effective again. When electromagnets 43, 44 and 45 are ineffective they permit magnetic material to slide down decline 41 whereas when they are effective they attract magnetic material and force it to lie across the width of decline 41 because the magnetic lines of force travel in that direction.

The aforementioned cycle is constantly repeated automatically after very short time intervals so that magnetic material and especially long pieces of scrap are oriented before falling into tiltable bucket 20 from decline 41. Electromagnets 43, 44 and 45 may be energized and de-energized for orientation, but for quick, satisfactory and responsive operation, the reversal of the polarity and the introduction of a resistor is a desirable feature because large electromagnets, such as electromagnets 43, 44 and 45, take a relative long period of time to build up adequate voltage.

To eliminate spillage under bucket 20 when it is tilted to fill container 17, limit switch 76 is provided for so as to interlock electromagnets 43, 44 and 45 and render them effective, despite timer 80, during the filling operation.

When the magnetic material at the pick-up point is depleted, electromagnet 52 reaches the bottom of scrap vehicle 25 and a small clamp 94 fastened to cable 53 actuates limit switch 95 which stops motor 85 from further lowering electromagnet 52 and bell 96 rings to remind the second helper to advance magnetic material from the back of body 97 of scrap vehicle 25 to the pick-up point.

The second helper presses button 98 which permits the continuation of the aforementioned cycle but when electromagnet 52 is out of the way, he opens switch 99 to stop the cycle again. He next pushes on lever 100 of controls of scrap vehicle 25, which lever actuated the tilting means, as for example cylinder 101, which in turn tilts body 97 to above the angle of repose of magnetic material to permit it to advance to the pick-up point. He lowers body 97 below the angle of repose, closes switch 99 and the operation of automatically lifting loads of magnetic material from the pick-up point and dropping them on impact stand 42 proceeds.

Having now completely described the wiring diagram, the charging machine operator by means of peel 18 rests container 17 on roller 21 which is universally joined to tilting members assembly 23. The downward push of peel 18 transmitted through pivot 51 to the other end of tilting members assembly 23, forces bucket 20 which is in turn pivoted about pivot 47, to travel through an arcuate path from below to above the angle of repose of magnetic material thereby filling charging container 17; oriented magnetic material thus lays with some semblance of arrangement within container 17, and long pieces of scrap do not stick out therefrom. Since the tilting of bucket 20 may be performed in so many ways such as mechanical, hydraulic, pneumatic, etc., therefore I do not intend to limit myself to the detailed description explained hereinbefore.

Once container 17 is filled, it is lifted from roller 21, and bucket 20 because of the location of its center of gravity returns to its receiving position taking with it the excessive magnetic material for which there was no room in container 17. Since bucket 20 gradually travels from below the angle of repose to the above and since the excessive material never leaves bucket 20 therefore spillage which is undesirable, as almost eliminated, but if any, it is collected in container 9.

The operator of charging machine 16 after lifting full container 17 from roller 21, inserts it into furnace 10 and empties sideways the contents thereof. When pulling empty container 17 of furnace 10, he again fills it as described hereinabove and empties again the contents into furnace 10. Container 17 is repeatedly cooled by cold magnetic material fed thereinto. The operation of filling container 17 with material which is cold and the operation of emptying the contents thereof is repeated until the complete charge is thus delivered.

If the charge for furnace 10 is greater than the capacity of scrap vehicle 25, another vehicle replaces it after depletion. To obtain proper distribution of the charge in furnace 10, the number of trips performed to empty repeatedly filled container 17 is the same through each of the furnace doors. When charging of furnace 10 is completed, loading apparatus 22 is moved by charging machine 16 in front of the next furnace to be charged, and the whole cycle of delivering, loading, orienting and charging magnetic material is repeated as described hereinbefore.

I do not mean to confine myself to the exact details of construction herein disclosed, but claim all variations falling within the purview of the appended claims.

I claim:

1. In a system for charging open hearth scrap into steel making furnaces situated side by side in battery form a loading apparatus having a carriage to serve as a base; a set of wheels to mount said carriage thereon; a superstructure extending upwardly from said carriage to serve as a supporting framework; a loading means supported from said superstructure to handle open hearth scrap; an orientation chute disposed to said superstructure to receive magnetic material from said loading means, and a charging container to be filled with oriented open hearth scrap and be emptied into the furnace charged.

2. In a system for charging open hearth scrap into steel making furnaces situated side by side in battery form a loading apparatus having a carriage to serve as a base; a set of wheels to mount said carriage thereon; a superstructure extending upwardly from said carriage to serve as a supporting framework; a travelling means running substantially parallel to the length of said carriage; a hoisting means operating in conjunction with said travelling means; a lifting electromagnet attached to said hoisting means to pick and deliver loads of open hearth scrap; a declined orientation chute disposed to said superstructure to receive loads of open hearth scrap from said lifting electromagnet, and a charging container to be filled with oriented open hearth scrap from said chute and be emptied into the furnace charged.

3. In a system for charging magnetic material into steel making furnaces situated side by side in battery form a loading apparatus having a carriage to serve as a base; a set of wheels to mount said base thereon; a superstructure extending upwardly from said carriage to serve as supporting framework; a travelling means running on top of said superstructure; a hoisting means operating in conjunction with said travelling means; a lifting electromagnet attached to said hoisting means to pick and deliver loads of magnetic material; a declined orientation chute disposed to said superstructure, equipped with electromagnetic means towards the discharge end thereof to orient the loads of magnetic material delivered to said chute by said lifting electromagnet, and a charging container to be filled with oriented magnetic material from said chute and be emptied into the furnace charged.

4. In a system for charging magnetic material into steel making furnaces situated side by side in battery form a loading apparatus having a carriage to serve as a base; a set of wheels to mount said carriage thereon; a superstructure extending upwardly from said carriage to serve as a supporting framework; a travelling means running on top of said superstructure; a hoisting means operating in conjunction with said travelling means; a lifting electromagnet attached to said hoisting means to pick and deliver loads of magnetic material; a declined orientation chute disposed to said superstructure, made-up of a portion declined slightly more than the angle of repose of magnetic material to serve as a rigid impact stand and of another portion still more declined equipped with multipolar electromagnetic means towards the discharge end thereof having the magnetic lines of force travelling in the direction of the width of said chute so that magnetic material and especially long pieces of scrap delivered to said chute by said lifting electromagnet are forced to lie across the width of said chute, and a charging container to be filled with oriented magnetic material from said chute and be emptied into the furnace charged.

5. In a system for charging magnetic material into steel making furnaces situated side by side in battery form a loading apparatus having a carriage to serve as a base; a set of wheels to mount said carriage thereon; a superstructure extending upwardly from said carriage to serve as a supporting framework; a travelling motorized trolley hoist running on top of said superstructure; a lifting electromagnet suspended from said hoist to pick and deliver loads of magnetic material; a declined orientation chute disposed to said superstructure, equipped with electromagnetic means towards the discharge end thereof to orient the loads of magnetic material delivered by said lifting electromagnet, and a charging container to be filled with oriented magnetic material from said chute and be emptied into the furnace charged.

6. In a system for charging magnetic material into steel making furnaces situated side by side in battery form a loading apparatus having a carriage to serve as a base; a set of wheels to mount said carriage thereon; a superstructure extending upwardly from said carriage to serve as a supporting framework; a travelling motorized trolley hoist running on top of said superstructure; a lifting electromagnet suspended from said hoist to pick and deliver loads of magnetic material; a declined orientation chute disposed to said superstructure, made-up of a portion declined slightly more than the angle of repose of magnetic material to serve as a rigid impact stand and of another portion still more declined equipped with multipolar electromagnetic means located towards the discharge end thereof and having the magnetic lines of force travelling in the direction of the width of said chute so that magnetic material and especially long pieces of scrap delivered to said chute by said lifting electromagnet are forced to lie across the width of said chute, and a charging container to be filled with oriented magnetic material from said chute and be emptied into the furnace charged.

7. In a system for charging magnetic material into steel making furnaces situated side by side in battery form a loading apparatus having a carriage to serve as a base; a set of wheels to mount said carriage thereon; a superstructure extending upwardly from said carriage to serve as a supporting framework; a cantilevered beam-assembly mounted on said superstructure to extend beyond the end of said carriage so that a magnetic material delivery means lodges thereunder; a travelling means running on said cantilevered beam-assembly; a hoisting means operating in conjunction with said travelling means; a lifting electromagnet attached to said hoisting means to pick and deliver loads of magnetic material; a declined orientation chute disposed to said superstructure, made-up of a portion declined slightly more than the angle of repose of magnetic material to serve as a rigid impact stand and of another portion still more declined equipped with multipolar electromagnetic means located towards the discharge end thereof and having the magnetic lines of force travelling in the direction of the width of said chute so that magnetic material and especially long pieces of scrap delivered to said chute by said lifting electromagnet are forced to lie across the width of said chute, and a charging container to be filled with oriented magnetic material from said chute and be emptied into the furnace charged.

8. In a system for charging magnetic material into steel making furnaces situated side by side in battery form a loading apparatus having a carriage to serve as a base; set of wheels to mount said carriage thereon; a superstructure extending upwardly from said carriage to serve as a supporting framework; a travelling means running on top of said superstructure; a hoisting means operating in conjunction with said travelling means; a lifting electromagnet attached to said hoisting means to pick and deliver loads of magnetic material; a declined orientation chute disposed to said superstructure, made-up of a portion declined to an angle greater than the angle of repose of magnetic material to serve as a rigid impact stand and of another portion still more declined equipped with multipolar electromagnetic means located towards the discharge end thereof and having the magnetic lines of force travelling in the direction of the width of said chute so that magnetic material and especially long pieces of scrap delivered to said chute by said lifting electromagnet are forced to lie across the width of said chute; a tiltable bucket equipped with tilting means, located at the discharge end of said chute to receive oriented magnetic material, and a charging container to be filled with oriented magnetic material from said bucket and be emptied into the furnace charged.

9. In a system for charging magnetic material into steel making furnaces situated side by side in battery form a loading apparatus having a carriage to serve as a base; a set of wheels to mount said base thereon; a superstructure extending upwardly from said carriage to serve as a supporting framework; a cantilevered beam-assembly mounted on said superstructure to extend beyond the end of said carriage so that a magnetic material delivery means lodges thereunder; a travelling motorized trolley hoist running on said cantilevered beam-assembly; a lifting electromagnet suspended from said hoist to pick and deliver loads of magnetic material; a declined orientation chute disposed to said superstructure, made-up of a portion more declined than the angle of repose of magnetic material to serve as a rigid impact stand and of another portion still more declined equipped with multipolar electromagnetic means located towards the discharge end thereof and having the magnetic lines force travelling in the direction of the width of said chute so that magnetic material and especially long pieces of scrap delivered to said chute by said electromagnet are forced to lie across the width of said chute; a charging container to be filled with oriented magnetic material from said chute and be emptied into the furnace charged, and a second container in storage located adjacent to the first one, to catch spillage and to provide an easy exchange when said first container becomes red hot from the repetitive insertion into the furnace charged.

10. In a system for charging magnetic material into steel making furnaces situated side by side in battery form a loading apparatus having a carriage to serve as a base; a set of wheels to mount said carriage thereon; superstructure extending upwardly from said carriage to serve as a supporting framework; a travelling means running on top of said superstructure; a hoisting means operating in conjunction with said travelling means; a lifting electromagnet suspended from said hoisting means, adapted to actuate a switch when reaching the level of magnetic material to automatically pick and deliver loads thereof; a declined orientation chute disposed to superstructure, made-up of a portion declined slightly more than the angle of repose of magnetic material to serve as a rigid impact stand and of another portion still more declined equipped with multipolar electromagnetic means located towards the discharge end thereof and having the magnetic line of force travelling in the direction of the width of said chute so that magnetic material and especially long pieces of scrap delivered to said chute by said lifting electromagnet are forced to lie across the width of said chute; a charging container to be filled with oriented magnetic material from said chute and be emptied into the furnace charged, and control means to automatically operate said loading apparatus.

11. In a system for charging magnetic material into steel making furnaces situated side by side in battery form a loading apparatus having a carriage to serve as a base; a set of wheels to mount said carriage thereon; superstructure extending upwardly from said carriage to serve as a supporting framework; a cantilevered beam-assembly on said superstructure to extend beyond the end of said carriage so that a delivery means lodges thereunder; a travelling motorized trolley hoist running on said cantilevered beam-assembly; a lifting electromagnet suspended from said hoist, adapted to actuate a switch when reaching the level of magnetic material to automatically pick and deliver loads of magnetic material; a declined orientation chute disposed to said superstructure, made-up of a portion declined slightly more than the angle of repose of magnetic material to serve as a rigid impact stand and of another portion still more declined equipped with multipolar electromagnetic means located at the discharge end thereof and having the magnetic lines of force travelling in the direction of the width of said chute so that magnetic material and especially long pieces of scrap delivered to said chute by said lifting electromagnet are forced to lie across the width of said chute; a tiltable bucket equipped with tilting means to receive oriented magnetic material from the discharge end of said chute; a charging container to be filled with oriented magnetic material from said bucket and be emptied into the furnace charged, and control means to automatically operate said loading apparatus.

12. In a system for charging magnetic material into steel making furnaces situated side by side in battery form a loading apparatus having a carriage to serve as a base; a set of wheels to mount said carriage thereon; a superstructure extending upwardly from said carriage to serve as supporting framework; a cantilevered beam-assembly mounted on said superstructure to extend beyond the end of said carriage so that a delivery means lodges thereunder; a travelling motorized trolley hoist running on said cantilevered beam-assembly; a lifting electromagnet suspended from said hoist, adapted to actuate a switch when reaching the level of magnetic material in said delivery means to automatically pick and deliver loads thereof; a declined orientation chute disposed to said superstructure, made-up of a portion declined slightly more than the angle of repose of magnetic material to serve as a rigid impact stand and of another portion still more declined equipped with multipolar electromagnetic means located towards the discharge end thereof and having the magnetic lines of force travelling in the direction of the width of said chute so that magnetic material and especially long pieces of scrap delivered to said chute by said lifting electromagnet are forced to lie across the width of said chute; a tiltable bucket equipped with tilting means, located at the discharge end of said chute to receive oriented magnetic material; a charging container to be filled with oriented magnetic material from said bucket and be emptied into the furnace charged; a second container in storage located adjacent to the first one, to catch spillage and provide an easy exchange when said first container becomes red hot from the repetitive insertion into said furnace charged; control means to automatically operate said loading apparatus, and coupling means to couple to said lodged delivery means.

References Cited in the file of this patent

UNITED STATES PATENTS

| | | |
|---|---|---|
| 1,593,756 | Debnar | July 27, 1926 |
| 1,849,680 | McKee | Mar. 15, 1932 |
| 2,415,376 | Strickland | Feb. 4, 1947 |